United States Patent [19]

Murray

[11] Patent Number: 4,730,547
[45] Date of Patent: Mar. 15, 1988

[54] PISTONS AND PISTON CASTINGS

[75] Inventor: Edward J. Murray, Ilkley, England

[73] Assignee: AE PLC, Rugby, England

[21] Appl. No.: 598,678

[22] Filed: Apr. 10, 1984

[30] Foreign Application Priority Data

Apr. 12, 1983 [GB] United Kingdom ............ 8309832

[51] Int. Cl.⁴ .................................. F01B 31/10
[52] U.S. Cl. ............................. 92/160; 92/208; 92/234
[58] Field of Search ............... 92/208, 214, 234, 237, 92/239, 158, 159, 160, 233; 123/193 P

[56] References Cited

U.S. PATENT DOCUMENTS

| 975,301 | 11/1910 | Talbot | 92/208 |
|---|---|---|---|
| 1,444,942 | 2/1923 | Anderson . | |
| 1,681,709 | 8/1928 | Nelson | 92/237 |
| 1,719,092 | 7/1929 | Taylor | 92/239 |
| 2,108,865 | 2/1938 | Long | 92/237 X |
| 3,213,766 | 10/1965 | Hutto | 92/230 |
| 3,319,535 | 5/1967 | Holcombe | 92/208 |
| 3,583,291 | 6/1971 | Zeekik . | |
| 3,987,709 | 10/1976 | Day | 92/237 |
| 4,161,165 | 7/1979 | Belush et al. | 92/237 |
| 4,274,372 | 6/1981 | Kelm et al. | 92/239 |

FOREIGN PATENT DOCUMENTS

| 477646 | 10/1973 | Australia . | |
|---|---|---|---|
| 0050257 | 4/1982 | European Pat. Off. . | |
| 1600483 | 4/1970 | Fed. Rep. of Germany . | |
| 608492 | 7/1926 | France . | |
| 328101 | 4/1930 | United Kingdom | 92/239 |
| 1029259 | 5/1966 | United Kingdom . | |
| 1126480 | 9/1968 | United Kingdom . | |
| 1394830 | 5/1975 | United Kingdom . | |
| 1505148 | 3/1978 | United Kingdom . | |
| 1582140 | 12/1980 | United Kingdom . | |

OTHER PUBLICATIONS

Scientific Publications Workshop Manual Series No. 75, "Holden HK Series", Scientific Publications Pty. Limited–Dec. 1969.
The Goodheart-Willcox Co., Inc. 1975–"Autoservice and Repair".
Page 55 of the Catalogue of J. C. Whitney & Co., "Automotive Parts and Accessories, Catalogue No. 295".

Primary Examiner—Edward K. Look
Attorney, Agent, or Firm—Leydig, Voit & Mayer

[57] ABSTRACT

A piston casting for forming a piston for an internal combustion engine or compressor comprises a generally cylindrical crown (10) having a ring belt (11) extending around the crown for the formation therein of one or more piston ring grooves. A gudgeon pin bore (14) extends through the piston casting in a direction normal to the piston axis and two opposed skirt thrust surfaces (17) depend from the ring belt and are symetrically disposed about a plane including the piston axis and normal to the gudgeon pin bore axis. The surfaces extend only part the way around the piston casting and terminate in respective spaced generally axially extending edges (18), each skirt thrust surface being extended circumferentially beyond the associated edges (at 19) at the ends of the edges remote from the crown.

4 Claims, 7 Drawing Figures

PISTONS AND PISTON CASTINGS

BACKGROUND OF THE INVENTION

The invention relates to piston castings for forming a piston for an internal combustion engine or compressor and to the pistons themselves. In particular, the invention relates to such piston castings and pistons of the kind having opposed part-cylindrical thrust surfaces.

SUMMARY OF THE INVENTION

According to a first aspect of the invention, there is provided a monolithic piston casting for forming a piston for an internal combustion engine or compressor and comprising a generally cylindrical crown having a ring belt extending around the crown for the formation therein of one or more piston ring grooves, a gudgeon pin bore extending through the piston casting in a direction normal to the piston axis, two opposed skirt thrust surfaces depending from the ring belt and symetrically disposed about a plane including the piston axis and normal to the gudgeon pin bore axis, the surfaces extending only part the way around the piston casting and terminating in respective spaced generally axially extending edges, each skirt thrust surface being extended circumferentially beyond the associated edges at the ends of the edges remote from the crown.

According to a second aspect of the invention, there is provided a piston for an internal combustion engine or compressor and comprising a generally cylindrical crown having a ring belt extending around the crown and including one or more piston ring grooves formed therein, a gudgeon pin bore extending through the piston and having an axis normal to the piston axis, a skirt depending from the ring belt and extending around the piston, the skirt forming two opposed arcuate skirt thrust surfaces symetrically disposed about a plane including the piston axis and normal to the gudgeon pin bore axis, and two skirt side panels extending between the skirt thrust surfaces and lying in respective planes normal to the gudgeon pin bore axis, the spacing of the side panels being between 0.6 and 0.8 of the diameter of the skirt thrust surfaces.

BRIEF DESCRIPTION OF THE DRAWINGS

The following is a more detailed description of two embodiments of the invention, by way of example, reference being made to the accompanying drawings, in which.

DESCRIPTION OF THE PREFERRED EMBODIMENTS

Figure 1:
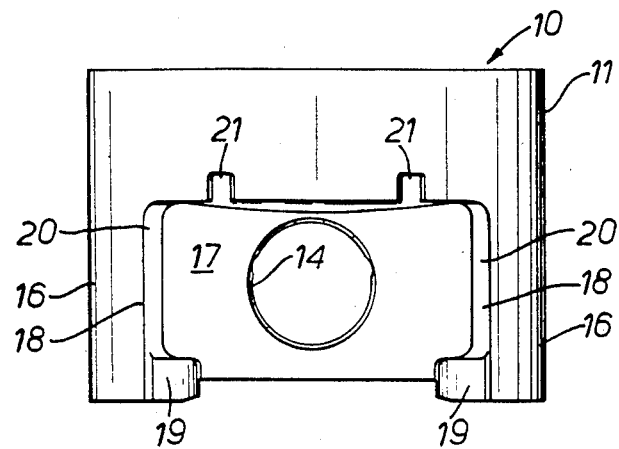
FIG. 1 is an elevation of a piston casting.

Referring first to FIG. 1, the piston casting is made from aluminium or any suitable aluminium alloy, such as that sold by the trade name Lo-Ex. The casting may be formed conventionally or by a squeeze casting process or by any other suitable casting process.

The casting comprises a generally cylindrical crown 10 having a ring belt 11 extending around the crown 10 for the formation therein of one or more piston ring grooves. There may be three grooves. Two gudgeon pin bosses 12 are connected to the crown by a web 13 and define a gudgeon pin bore 14 whose axis is normal to the piston axis. Although only one web 13 is shown, there may be two or more such webs. An expansion control insert 15 is cast into the casting and may be of any suitable kind such as that described in our copending British Patent Application No. 80.30430.

A skirt depends from the ring belt 11 and includes two opposed thrust surfaces 16 and two side panels 17. The thrust surfaces 16 are arcuate and are symetrically disposed about a plane including the piston axis but normal to the gudgeon pin bore axis. These thrust surfaces 16 extend only part the way around the casting, generally for an arcuate extent of 120° although this figure may be greater or smaller. Each thrust surface 16 terminates in spaced axially extending edges 18 (see FIGS. 1 and 5). At the end of each edge 18 remote from the crown 10, the thrust surface is continued to form a projection 19.

The side panels 17 extend between adjacent edges 18 of the thrust surfaces 16 and around the entrances to the gudgeon pin bore 14. The panels 17 lie in respective planes parallel to, but spaced on either side of, the piston axis. The panels 17 are not connected directly to the edges 18 of the thrust surfaces 16; bevelled surfaces 20 are provided between them. The spacing between the side panels 17 is between 0.6 and 0.8 of the diameter across the thrust surfaces 16. A preferred ratio is 0.7.

Figure 2:
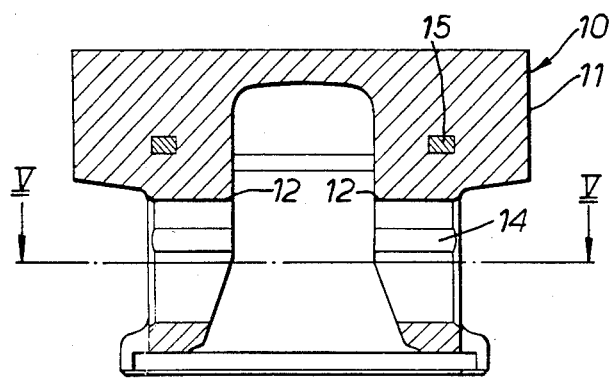
FIG. 2 is a vertical cross-section through the piston casting of FIG. 1.
Figure 3:
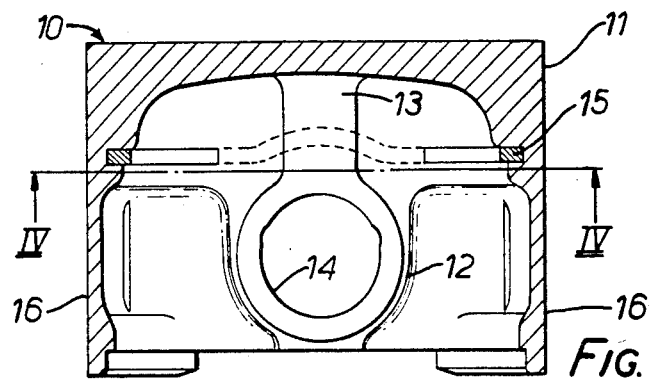
FIG. 3 is a vertical cross-section of the casting of FIGS. 1 and 2 in a plane at right angles to the sectional plane of FIG. 2.
Figure 4:
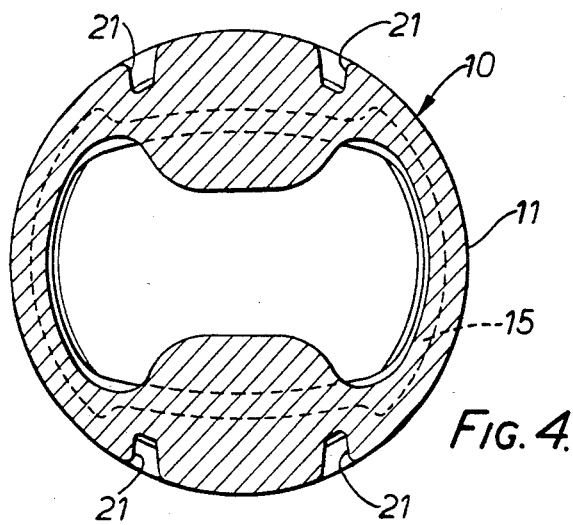
FIG. 4 is a section on the lines IV—IV of FIG. 3.

Two pairs of slots 21 are also provided in the casting. The slots 21 are so positioned that when the lowermost piston ring groove is machined in the belt 11, the slots provide oil drainage slots leading from a wall of the groove remote from the crown. The pairs of slots 21 are arranged in respective parts of the ring belt which, as seen in FIG. 2, overhang the side panels 17. After casting, the piston casting is finish machined. The piston ring grooves are cut, with the slots 21 then forming drainage slots. The drainage slots 21, being cast in, eliminate the need for drilling through the oil ring groove to give direct drainage to the inside of the piston and hence to the sump. The external drainage provided by the slots 21 is advantageous when piston cooling by oil jet is used since it eliminates any outflow of oil through drain holes drilled from the oil ring groove. With the external drainage slots 21, the presence of relatively large amounts of oil does not interfere with the proper function of the oil scraping ring, which, experience shows, does require some drainage.

Figure 5:
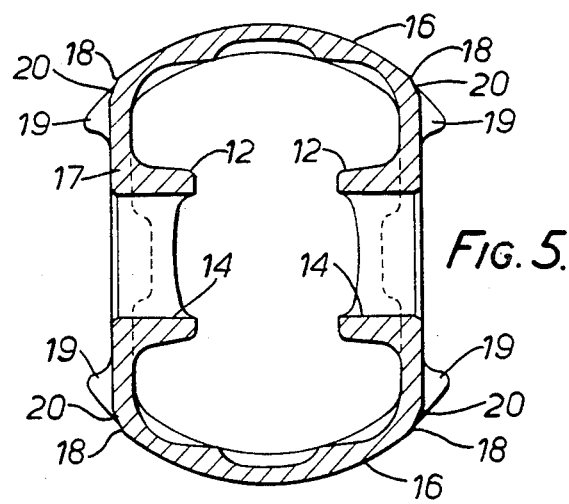
FIG. 5 is a section on the line V—V of FIG. 2, and FIGS. 6A and 6B each are a similar view to FIG. 1 but showing a piston formed from a piston casting of the kind shown in FIGS. 1 to 5 but modified by the provision of holes or windows in side panels of the piston casting.

The thrust surfaces 16 are also machined with the bevelled surfaces 20 assisting machining and preventing burrs, which are commonly formed when the machining operation is a diamond turning. Rounded corners are also provided at the outer ends of the slots 21 for the same purpose. The projections 19 also assist the finish machining of the casting by extending the circumferential length of the lower edge of the skirt, extending from the thrust surface 16 and being spaced inwardly from an imaginary cylindrical extension of the skirt thrust surface as seen in FIG. 5, so providing a better platform for steadying the piston while it is being machined. In addition, the projections 19 also eliminate undesirable stress raisers.

It will be appreciated that the features of the projections 19, the bevelled surfaces 20 and the slots 21 need not all be provided together on a piston casting, they may be provided separately or in any desired combination.

The piston so formed is light in weight yet has required rigidity/flexibility characteristics and this is due to the ratio of the distance between the side panels 17 and the diameter across the thrust surfaces 16. If this ratio is less than 0.6, the skirt is very rigid and 'box-like' so that the required rigidity/flexibility in the thrust surfaces 16 can only be achieved by cutting slots in the skirt, and this is undesirable. If the ratio is greater than 0.8, the cross-sectional shape of the skirt is too close to the conventional circular cross-section shape to afford any weight saving.

Figure 6:
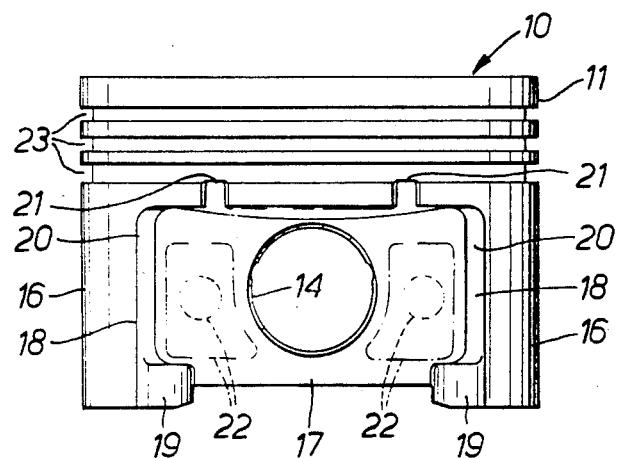

FIGS. 6A and 6B show a finished piston formed from a piston casting of the kind described above with reference to FIGS. 1 to 5. Parts common to FIGS. 1 to 5 and to FIGS. 6A and 6B are given the same reference numerals and are not described in detail. In the casting from which the piston of FIGS. 6A and 6B is formed, the side panels 17 are provided with holes 22 or windows 22. There are two such holes 22 or windows 22 on each panel, one on each side of the entrance to the gudgeon pin bore 14. The holes 22 or windows 22 may have any convenient shape or size, such as those shown in FIGS. 6A and 6B, respectively. There may be any convenient number of holes or windows. The purpose of the holes 22 or windows 22 is to reduce the weight of the piston. Since the side panels 17 are relatively lightly stressed, the provision of such holes 22 or windows 22 has no substantial effect on the strength of the piston.

The piston includes three piston ring grooves 23, and it will be seen that the lowermost piston ring groove cuts through the slots 21 so that the slots 21 form passages leading from the lowermost radial surface of the lowermost piston ring groove to respective points above the side panels 17. This allows the drainage of oil from the piston ring groove, as described above.

I claim:

1. A monolithic piston casting of aluminium or aluminium alloy for forming a piston for an internal combustion engine or compressor and comprising:
    a cast generally cylindrical crown having a ring belt extending around the crown for the formation therein of one or more piston ring grooves,
    two cast gudgeon pin bosses defining a gudgeon pin bore extending through the piston casting in a direction normal to the piston axis,
    two opposed cast skirt thrust surfaces connected to and depending from the ring belt and symmetrically disposed about a plane including the piston axis and normal to the gudgeon pin bore axis,
    each skirt thrust surface extending only part the way around the piston casting and terminating in respective spaced generally axially extending edges,
    cast skirt side panels extending between adjacent edges of the skirt surfaces, the side panels lying in respective planes parallel to, but spaced on either side of, the piston axis, each said gudgeon pin boss extending inwardly of an associated skirt side panel, and
    a projection extending circumferentially from each edge of each skirt thrust surface beyond the associated edge at the end of the edge remote from the crown, each projection being spaced inwardly from an imaginary cylindrical extension of the skirt thrust surfaces to provide a platform for steadying the piston casting while it is being machined.

2. A piston casting according to claim 1, wherein each said panel is connected at both side edges to the associated thrust surfaces by bevelled surfaces extending between the edges of the thrust surfaces and the side panels.

3. A piston casting according to claim 1 wherein the spacing of the side panels is between 0.6 and 0.8 of the diameter of the skirt thrust surfaces.

4. A piston casting according to claim 1 including two pairs of cast slots so positioned in the exterior of the ring belt above the respective side panels that, on machining of a piston ring groove in the belt, the slots provide exterior oil drainage slots leading from a wall of the piston ring groove remote from the crown to the exterior of the side panels.

* * * * *